(12) United States Patent
Goto

(10) Patent No.: US 8,791,943 B2
(45) Date of Patent: Jul. 29, 2014

(54) IMAGE PROCESSING DEVICE, IMAGE PROCESSING METHOD AND PROGRAM

(75) Inventor: Junichiro Goto, Tokyo (JP)

(73) Assignee: Sony Corporation, Tokyo (JP)

( * ) Notice: Subject to any disclaimer, the term of this patent is extended or adjusted under 35 U.S.C. 154(b) by 804 days.

(21) Appl. No.: 12/966,522

(22) Filed: Dec. 13, 2010

(65) Prior Publication Data

US 2011/0199371 A1 Aug. 18, 2011

(30) Foreign Application Priority Data

Feb. 15, 2010 (JP) ................................. 2010-030100

(51) Int. Cl.
*G06T 15/00* (2011.01)
*H04N 15/00* (2006.01)
*H04N 13/00* (2006.01)
*H04N 13/02* (2006.01)

(52) U.S. Cl.
USPC .................. 345/419; 348/42; 348/51; 348/52

(58) Field of Classification Search
CPC ... G06F 3/1454; G06F 3/1423; H04N 13/007; H04N 5/23293; H04N 13/0059; H04N 13/0003; H04N 13/0007
See application file for complete search history.

(56) References Cited

U.S. PATENT DOCUMENTS

| 7,046,270 B2 * | 5/2006 | Murata et al. .................... 348/45 |
| 2010/0103168 A1 * | 4/2010 | Jung et al. ...................... 345/419 |

FOREIGN PATENT DOCUMENTS

JP          10-290407          10/1998

* cited by examiner

*Primary Examiner* — Tize Ma
(74) *Attorney, Agent, or Firm* — Oblon, Spivak, McClelland, Maier & Neustadt, L.L.P.

(57) ABSTRACT

An image processing device includes a display portion which displays an image stored in a recording medium; an information output portion which is connected to a display device displaying a plane image or a stereoscopic image to output image information for displaying the image, which is stored in the recording medium, on the display device; and a control portion which performs the control of displaying the image stored in the recording medium and operational support information for supporting the display operation of the image on the display portion and the display device, and performs the control so that, when the image which is the display target is the stereoscopic image, the operational support information is displayed on the display portion and the image which is the display target is not displayed on the display portion.

10 Claims, 10 Drawing Sheets

FIG. 3
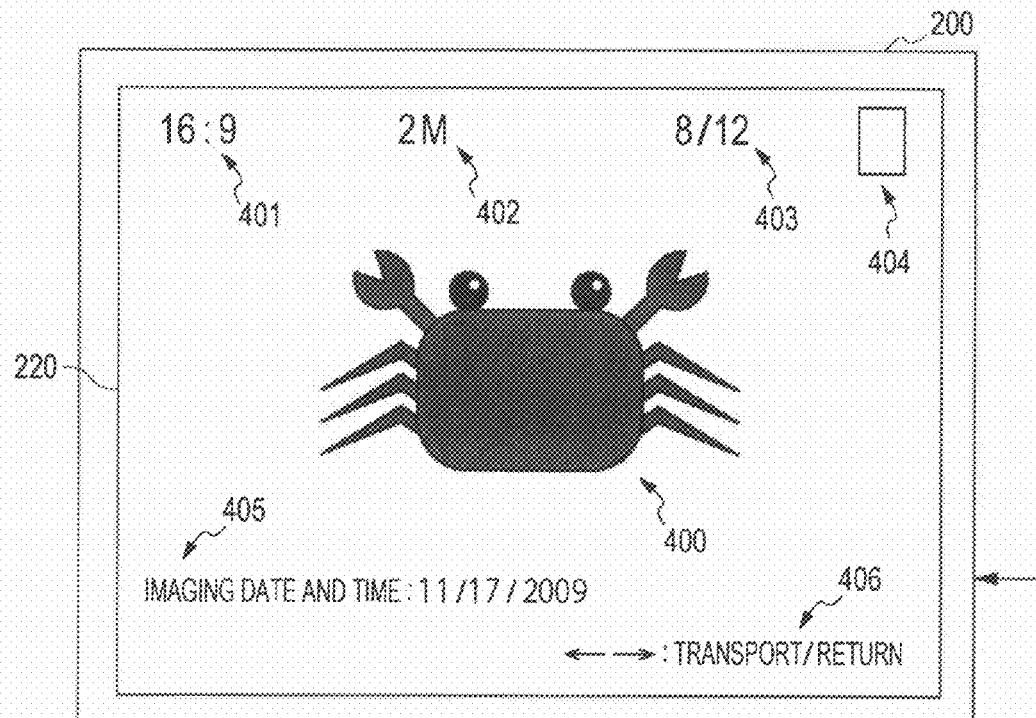
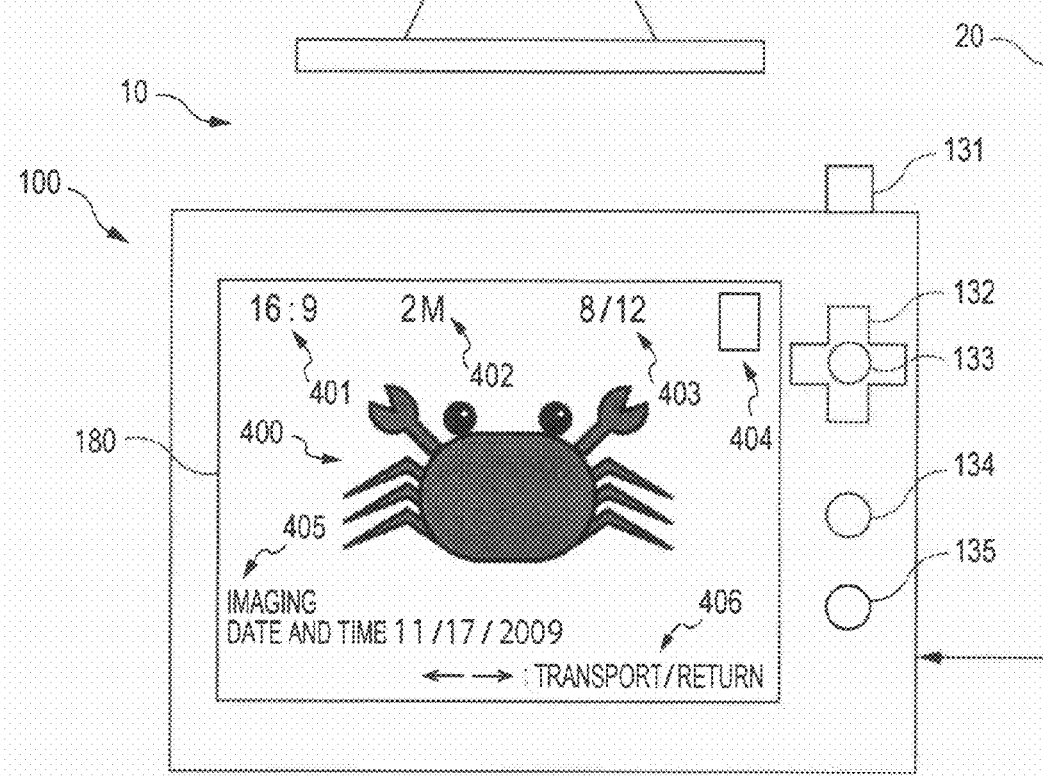

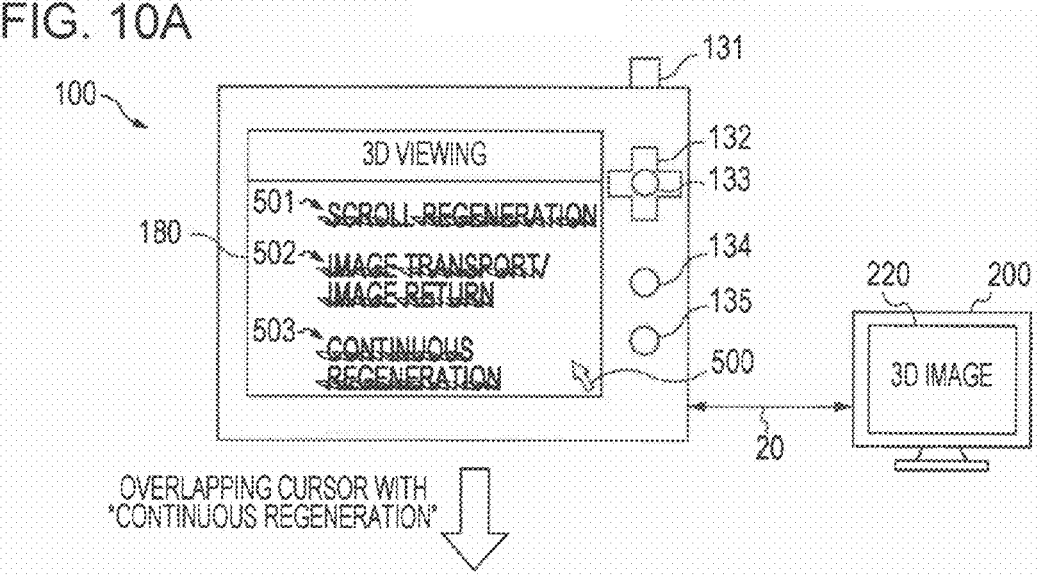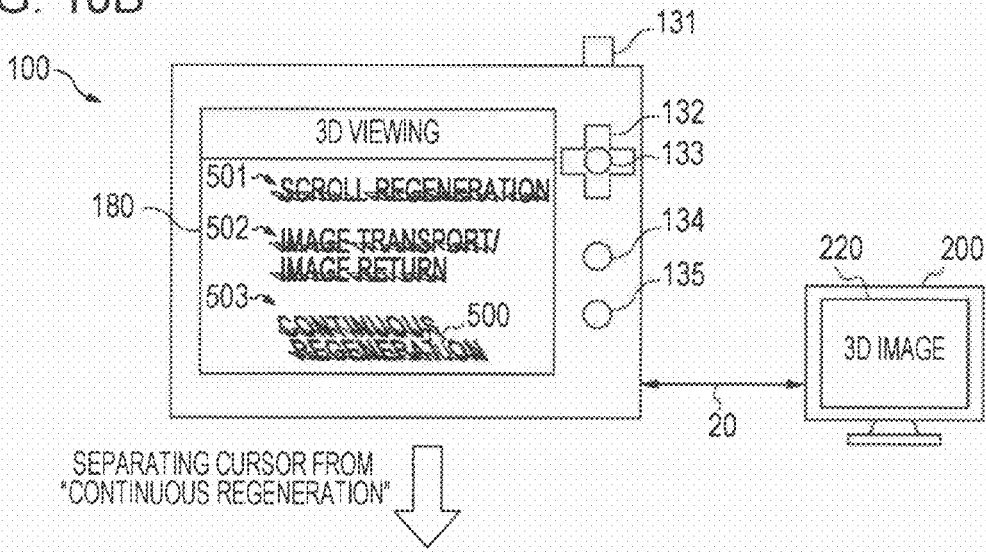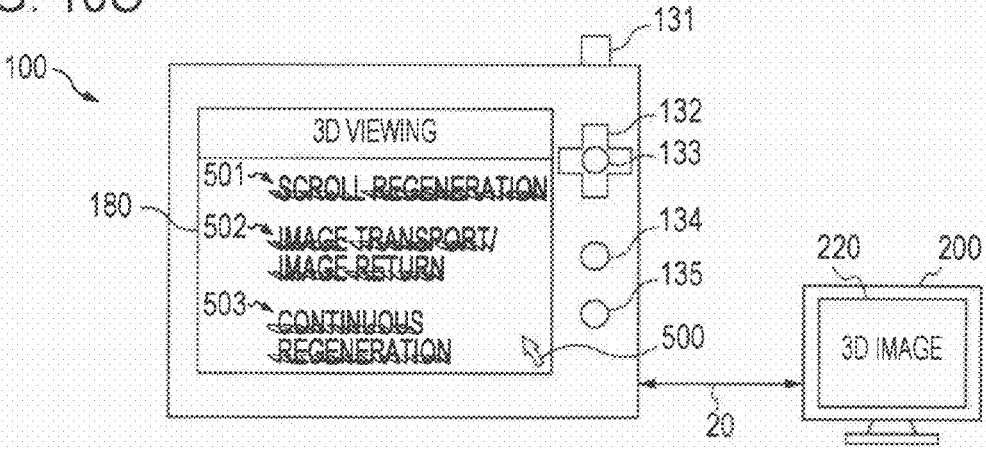

IMAGE PROCESSING DEVICE, IMAGE PROCESSING METHOD AND PROGRAM

BACKGROUND OF THE INVENTION

1. Field of the Invention

The present invention relates to an image processing device. Particularly, the present invention relates to an image processing device and an image processing method that display a stereoscopic image and a program that executes the method in a computer.

2. Description of the Related Art

Recently, there is increasing use of imaging devices such as a digital still camera or a digital video camera (e.g., a recorder equipped with a camera), which images a subject such as a person or an animal to create image data, thereby recording the image data as image contents. Furthermore, a reproduction method is suggested which sequentially outputs the respective image contents thus recorded to a display device such as a television and displays the respective image contents with respect to the display device. As a result, for example, since the image contents recorded by the imaging device can be displayed and viewed on a large display device, a user can further view the image contents.

In this manner, in a case where the image contents are sequentially output from the imaging device to the display device and are displayed, for example, it can be considered that operational support information concerning the operation is overlapped with the image (the image contents) and is displayed on the imaging device and the display portion of the display device. In this manner, the operational support information is overlapped with the image and is displayed on the imaging device and the display portion of the display device, whereby a user can easily perform the operation while viewing the image contents.

Herein, as the image contents which are the display target, images are supposed which greatly differ in a color or a luminance depending on the subject which is the imaging target, the imaging condition, the imaging environment or the like. For this reason, in order that a user easily views the image contents, it can be considered that the image contents are adjusted and viewed. However, although the image itself can be easily viewed by the adjustment, it can also be supposed that the operational support information displayed on the image in an overlapped manner becomes difficult to see.

Thus, for example, an on-screen display level correction device is proposed in which, in a case where the brightness of the video is controlled to be lower, the RGB output level is greatly corrected (e.g., Japanese Unexamined Patent Application Publication No. 10-290407 (FIG. 1)).

SUMMARY OF THE INVENTION

According to the related art mentioned above, since it is possible to enlarge the level ratio of the RGB signal relative to the video signal when the video signal is mixed with the RGB signal, even when the brightness of the video is adjusted to be lower, it is possible to prevent the on-screen display from becoming difficult to see.

Thus, recently, many stereoscopic image display methods have been proposed for displaying the stereoscopic image which can obtain a three-dimensional vision using a parallax of a left eye and a right eye. Furthermore, an imaging device such as a digital still camera or a digital video camera (a recorder equipped with a camera) is suggested which records the image data for displaying the stereoscopic image as the image contents (the stereoscopic image contents).

For this reason, for example, it is also supposed that the stereoscopic image contents recorded by the imaging device are sequentially output to a display device such as a television and the stereoscopic image is displayed on the display device. In this case, it is considered that the operational support information (a plane image) is displayed on the stereoscopic image in an overlapped manner.

However, since the stereoscopic image is an image that is viewed in three dimensions, in a similar manner to a case of displaying an ordinary plane image, when the operational support information (the plane image) is displayed on the stereoscopic image in an overlapped manner, it is also supposed that the operational support information is covered by the stereoscopic image, whereby the operational support information is difficult to see. Furthermore, it is considered that the operational support information is displayed on the stereoscopic image in an overlapped manner so that the sense of depth of the operational support information becomes a suitable position by considering a sense of depth of the stereoscopic image which is the display target. In this case, since there is an increase in the amount of calculations in regard to a position where the operational support information should be arranged and the load applied to the display processing increases, there is a problem in that the display of the operational support information is delayed and is difficult to see.

It is desirable to make the operational support information easier to see in the case of displaying the stereoscopic image.

According to a first embodiment of the present invention, there is provided an image processing device, an image processing method, and a program that executes the method in a computer, including, on a first side face thereof, a display portion which displays an image stored in a recording medium; an information output portion which is connected to a display device displaying a plane image or a stereoscopic image to output image information for displaying the image stored in the recording medium on the display device; and a control portion which performs the control of displaying the image stored in the recording medium and operational support information for supporting the display operation of the image on the display portion and the display device, and performs the control so that, when the image which is the display target is the stereoscopic image, the operational support information is displayed on the display portion and the image which is the display target is not displayed on the display portion. As a result, there is provided an action, in which the control is performed so that the image and the operational support information stored in the recording medium are displayed on the display portion and the display device, whereby, when the image which is the display target is the stereoscopic image, the operational support information is displayed on the display portion and the image which is the display target is not displayed on the display portion.

Moreover, in the first embodiment, a display mode setting portion, which sets either a stereoscopic image display mode for displaying the stereoscopic image on the display device or a plane image display mode for displaying a plane image on the display device, is further included. In a case where the image which is the display target is the stereoscopic image, when the stereoscopic image display mode is set, the control portion performs the control of displaying only the stereoscopic image on the display device and displaying only the operational support information on the display portion, and when the plane image display mode is set, the control portion may make the stereoscopic image into the plane image and display the image, in which the operational support information is overlapped with the plane image, on the display portion and the display device. As a result, there is provided an action, in which, in a case where the image which is the display target is the stereoscopic image, when the stereoscopic image display mode is set, the control of displaying only the stereoscopic image on the display device and displaying only the operational support information on the display portion is performed, and when the plane image display mode is set, the stereoscopic image is made into the plane image, and the image, in which the operational support information is overlapped with the plane image, is displayed on the display portion and the display device.

Furthermore, in the first embodiment, the control portion may change at least one of the arrangement, the color, the luminance, and the size of the characters in the display portion of the operational support information depending on whether the image which is the display target is the plane image or the stereoscopic image. As a result, there is provided an action in which at least one of the arrangement, the color, the luminance, and the size of the characters in the display portion of the operational support information is changed depending on whether the image which is the display target is the plane image or the stereoscopic image.

Moreover, in the first embodiment, the control portion may display only the stereoscopic image on the display device and display only the operational support information on the display portion when the image which is the display target is the stereoscopic image. As a result, there is provided an action in which only the stereoscopic image is displayed on the display device and only the operational support information is displayed on the display portion when the image which is the display target is the stereoscopic image.

Furthermore, in the first embodiment, the control portion may display at least a part of the operational support information on the display portion as the stereoscopic image, when the image which is the display target is the stereoscopic image. As a result, there is also provided an action in which at least a part of the operational support information is displayed as the stereoscopic image on the display portion, when the image which is the display target is the stereoscopic image.

Moreover, in the first embodiment, the control portion may display the image, in which the operational support information is overlapped with the plane image, on the display portion and the display device, when the image which is the display target is the plane image. As a result, there is provided an action in which the image, in which the operational support information is overlapped with the plane image, is displayed on the display portion and the display device, when the image which is the display target is the plane image.

According to an embodiment of the present invention, it is possible to obtain a superior effect in which the operational support information is easily viewed in the case of displaying the stereoscopic image.

BRIEF DESCRIPTION OF THE DRAWINGS

FIG. 3 is a diagram that shows a display example of a display portion (an imaging device) and a display portion (a display device) in the first embodiment of the present invention;

FIGS. 10A to 10C are diagrams that show transition examples of a display screen to be displayed on a display portion in the second embodiment of the present invention.

DESCRIPTION OF THE PREFERRED EMBODIMENTS

Hereinafter, embodiments for carrying out the present invention (hereinafter, referred to as embodiments) will be described. The description will be made by the following order.
1. First Embodiment (a display control: an example in which display states of an imaging device and a display device are changed depending on whether or not image contents which are the display target is a stereoscopic image)
2. Second Embodiment (a display control: an example in which operational support information (a stereoscopic image) is displayed on an imaging device when image contents which are the display target is a stereoscopic image)

1. First Embodiment

Configuration Example of Contents Reproduction System

Figure 1:
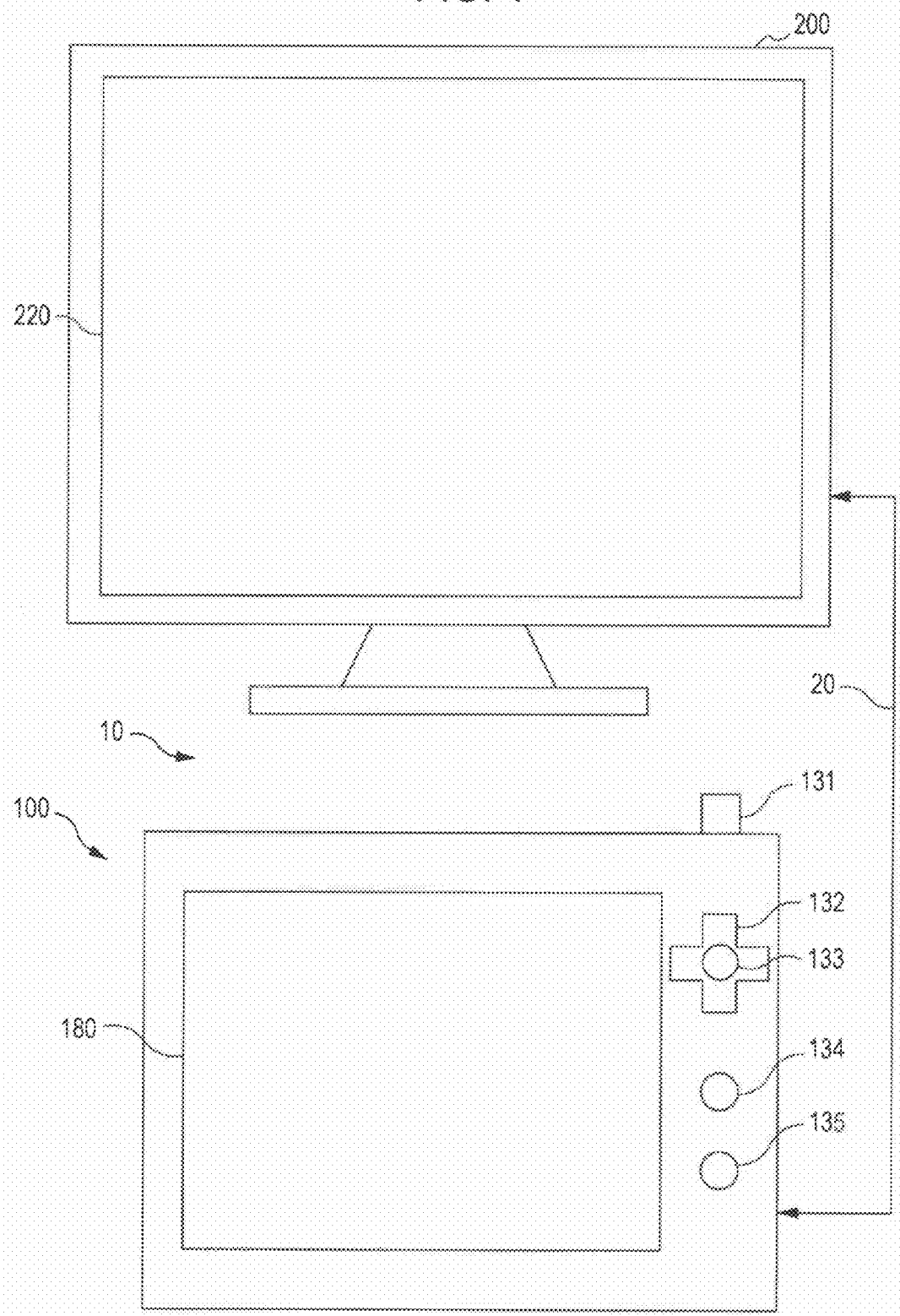
FIG. 1 is a diagram that shows a system configuration example of a contents reproduction system in a first embodiment of the present invention.

FIG. 1 is a diagram that shows a system configuration example of a contents reproduction system 10 of a first embodiment of the present invention. The contents reproduction system 10 includes an imaging device 100 and a display device 200. Furthermore, the imaging device 100 and the display device 200 are connected to each other by an inter-device interface 20. The inter-device interface 20 can use, for example, a HDMI (High-Definition Multimedia Interface) cable. In addition, as the inter-device interface 20, another inter-device interface may be used in which the imaging device 100 and the display device 200 are connected to each other by wire or wireless, whereby the communication between the imaging device 100 and the display device 200 can be performed.

The imaging device 100 is an imaging device which images a subject to create a captured image (an image data) and can record the captured image thus created on a recording medium as image contents (still screen contents or motion picture contents). Furthermore, the imaging device 100 is an imaging device that can create the image contents for displaying the stereoscopic image (3D image). For example, the imaging device 100 images the subject to create two captured images (a left eye image and a right eye image for displaying the stereoscopic image), and creates the image contents for displaying the stereoscopic image based on two captured images thus created.

Furthermore, the imaging device 100 outputs the image contents stored in the recording medium to the display device 200 via the inter-device interface 20 and displays the output image contents on the display device 200. In this case, it is possible to display the same image as the image, which is displayed on the display device 200, on the display portion 180. Moreover, for example, the imaging device 100 has the function of outputting the image contents (the stereoscopic image) stored in the recording medium to the display device 200 and performing the 3D viewing reproduction (e.g., a slide show) in the display device 200. During reproduction or the like, the respective operating members (131 to 135) are used. In addition, the imaging device 100 is realized by a digital still camera or a digital video camera (e.g., a recorder equipped with a camera). Furthermore, the functional configuration of the imaging device 100 will be specifically described with reference to FIG. 2.

The display device 200 is a display device that can display the image contents, which were input from the imaging device 100 via the inter-device interface 20 and a connection terminal (not shown), on the display portion 220. Furthermore, a user wears specialized glasses (e.g., active shutter type glasses or polarizing plate type glasses) for viewing the stereoscopic image, whereby the display device 200 can provide a user with the stereoscopic image.

For example, a case is supposed where a user wears active shutter type glasses (glasses with a shutter mechanism attached thereto) as the specialized glasses and the stereoscopic image is displayed. In this case, the display device 200 displays the image contents (the stereoscopic image contents), which was input from the imaging device 100, on the display portion 220 by a frame sequential display method (a method of alternately displaying the right eye image and the left eye image). Furthermore, the specialized glasses (the active shutter type glasses) alternately opens and closes the liquid crystal shutter (an electronic shutter) equivalent to the lens portion of the specialized glasses in synchronization with the left eye image and the right eye image that are alternately displayed on the display portion 220. That is, when the right eye image is displayed on the display portion 220, the left eye of the specialized glasses is closed, and when the left eye image is displayed on the display portion 220, the right eye of the specialized glasses is closed. In this manner, a user views the image, which is displayed on the display portion 220 (one display), using the specialized glasses, whereby the stereoscopic image can be viewed. For example, the display device 200 is realized by a video watching device such as a television capable of displaying the stereoscopic images.

Configuration Example of Imaging Device

Figure 2:
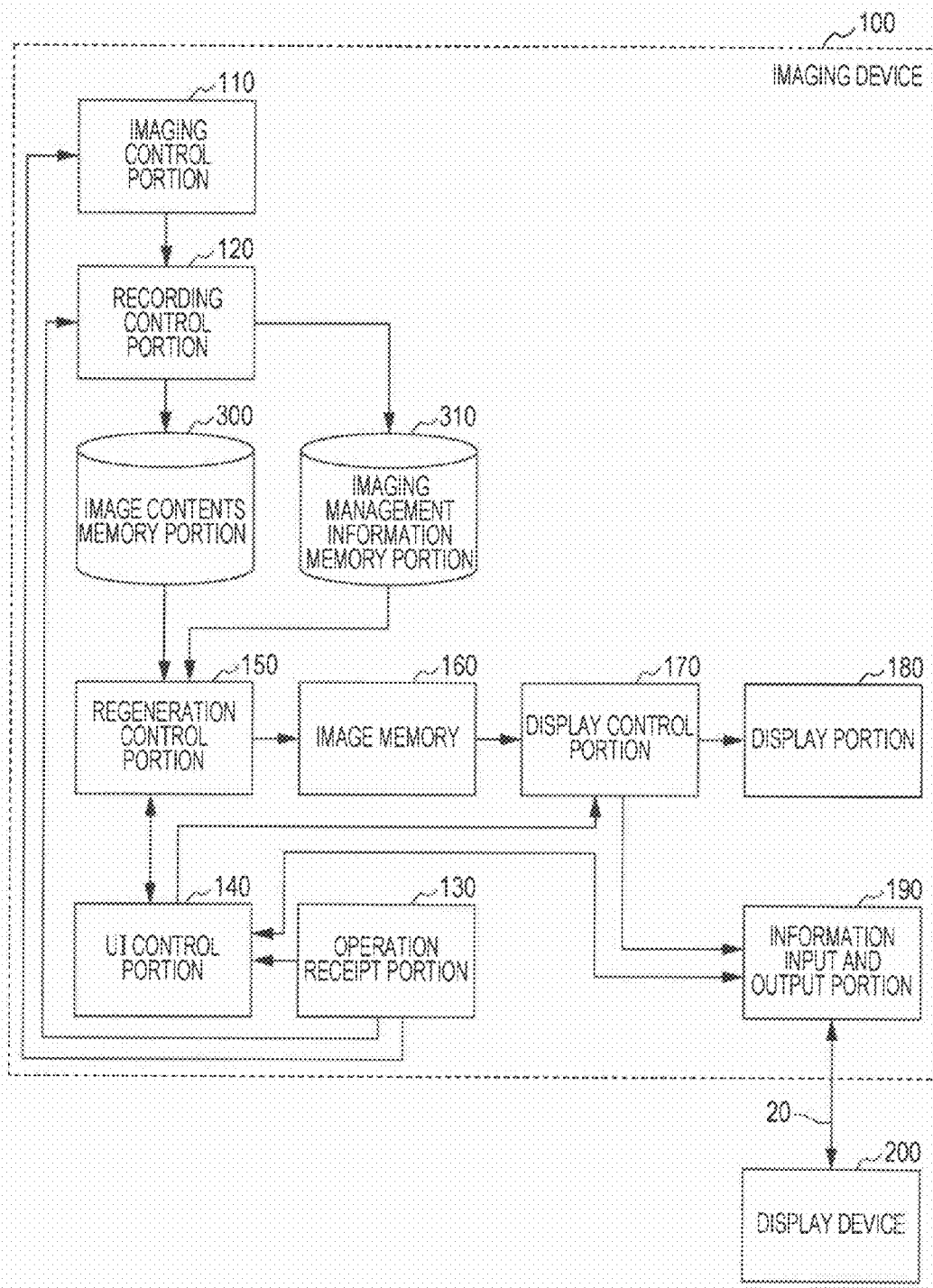
FIG. 2 is a block diagram that shows a functional configuration example of an imaging device in the first embodiment of the present invention.

FIG. 2 is a block diagram that shows a functional configuration example of the imaging device 100 in a first embodiment of the present invention. The imaging device 100 includes an imaging control portion 110, a recording control portion 120, an operational receipt portion 130, a UI control portion 140, a reproduction control portion 150, an image memory 160, a display control portion 170, a display portion 180, and an information input and output portion 190. Furthermore, the imaging device 100 includes an image contents memory portion 300 and an image management information memory portion 310.

The image contents memory portion 300 stores the image contents (an image file) based on the recording control by the recording control portion 120. As the image contents, for example, plane image (a 2D image) contents, stereoscopic image (3D image) contents, and motion image contents are stored. In addition, the respective image contents are stored, for example, based on a DCF (Design rule for Camera File system) standard. Furthermore, in the respective image contents, attribute information (attribute information such as kind of image contents, an image updating date and time, image size, color space information, a maker name) are recorded. As a result, the kind of the respective image contents can be distinguished.

The image management information memory portion 310 stores the management information (the image management information) concerning the image contents stored in the image contents memory portion 300 based on the recording control by the recording control portion 120. The kinds of the respective image contents can be distinguished using the image management information. In addition, the image contents memory portion 300 and the image management information memory portion 310 may be built into the imaging device 100 and may be attachable to and detachable from the imaging device 100.

The imaging control portion 110 includes an imaging portion corresponding to the stereoscopic imaging, captures the subject to create the captured image (the image data) based on a user operation received by the operation receipt portion 130, and outputs the captured image created to the recording control portion 120. For example, when the recording instruction operation (e.g., a pressing operation of a shutter button 131 shown in FIG. 1) of recording the 2D image contents was received, the imaging control portion 110 creates one captured image. Furthermore, for example, when the recording instruction operation of recording the motion picture contents was received, the imaging control portion 110 creates the motion picture. Moreover, for example, when the recording instruction operation of recording the 3D image contents was received, the imaging control portion 110 captures the subject to create two captured images (the left eye image and the right eye image for displaying the stereoscopic image).

The recording control portion 120 records the captured image supplied from the imaging control portion 110 in the image contents memory portion 300 as the image contents (image files). During recording, various information (imaging date and time, image size, and the kind of contents) concerning the imaging time by the imaging control portion 110 is recorded in the image contents. Moreover, the recording control portion 120 records the image management information concerning the recorded image contents in the image management information memory portion 310.

The operation receipt portion 130 is an operation receipt portion which receives the operation input from a user, and outputs the operation content depending on the receipt operation input to the imaging control portion 110, the recording control portion 120, and the UI control portion 140. For example, operation members such as a shutter button 131, a cross button 132, a decision button 133, and operation buttons 134, 135 shown in FIG. 1 are included in the imaging deice 100, and the operation input is received by these members. For example, when the setting operation of setting the 2D viewing mode or the 3D viewing mode as the viewing mode of the display device 200 is received, the operation receipt portion 130 outputs this to the UI control portion 140. Furthermore, when the change operation (e.g., the image forwarding operation, and the image return operation) of changing the display state of the image that is displayed on the display device 200, the operation receipt portion 130 outputs this to the UI control portion 140.

The UI control portion 140 performs the control that displays the image contents, which are stored in the image contents memory portion 300, on the display portion 180 and the display device 200 based on the operation input received by the operation receipt portion 130. For example, when the image which is the display target is the plane image, the UI control portion 140 performs the control that displays the image, in which the operational support information (for example, the operational support information 401 to 406 shown in FIG. 3) is overlapped with the plane image, on the display portion 180 and the display device 200. Furthermore, for example, when the image which is the display target is the stereoscopic image, the UI control portion 140 performs the control so that the image which is the display target is not displayed on the display portion 180 but the operational support information (for example, the operational support information 411 to 416 shown in FIG. 4) is displayed on the display portion 180. In this case, the UI control portion 140 displays only the stereoscopic image on the display device 200. Moreover, for example, the UI control portion 140 sets either the stereoscopic image display mode for displaying the stereoscopic image on the display device 200 or the plane image display mode for displaying the plane image on the display device 200. In addition, the UI control portion 140 is an example of the control portion and the display mode setting portion described in the claims.

The reproduction control portion 150 performs the reproduction control for displaying the image contents, which are stored in the image contents memory portion 300, on the display portion 180 and the display device 200, based on the control of the UI control portion 140. For example, when the reproduction instruction operation of the image contents is performed, the reproduction control portion 150 acquires and decodes the image contents designated by a user from the image contents memory portion 300, and develops the decoded image data to a predetermined area in the image memory 160. Moreover, the reproduction control portion 150 distinguishes the kinds (the 2D image contents, the 3D image contents, and the motion image contents) of the image contents acquired from the image contents memory portion 300, and notifies the distinction results thereof to the UI control portion 140. In addition, regarding the distinction of the kind of the image contents, the attribute information recorded in the image contents may be used, and the image management information stored in image management information memory portion 310 may be used.

The image memory 160 maintains the image data decoded from the reproduction control portion 150 and supplies the maintained image data to the display control portion 170.

The display control portion 170 controls the display state in the display portion 180 and the display device 200 based on the control of the UI control portion 140. For example, in a case where the 2D viewing mode is set, when the image which is the display target is the 2D image, the display control portion 170 creates the image (the 2D image) in which the operational support information is overlapped with the image data maintained in the image memory 160. The operational support information is an OSD (on-screen display) image and, for example, is the operational support information 401 to 406 shown in FIG. 3. In addition, the operational support information will be specifically described with reference to FIGS. 3, 4 or the like. Moreover, the display control portion 170 displays the created 2D image on the display portion 180 and the display device 200. That is, the display control portion 170 displays the created 2D image on the display portion 180 and transmits the image information (e.g., the data stream) for displaying the created 2D image on the display device 200 to the display device 200 via the information input and output portion 190.

Furthermore, for example, in a case where the 2D viewing mode is set, when the image which is the display target is the 3D image, the display control portion 170 displays the image data, which is maintained in the image memory 160, as the 2D image on the display portion 180 and the display device 200. That is, the display control portion 170 creates the 2D image using either the right eye image or the left eye image constituting the 3D image, overlaps the operational support information with the 2D image and displays this on the display portion 180 and the display device 200.

Furthermore, for example, in a case where the 3D viewing mode is set, when the image which is the display target is the 3D image, the display control portion 170 displays the image data, which is maintained in the image memory 160, as the 3D image on the display device 200. In this case, the display control portion 170 displays the 3D image on the display device 200, and does not display the 3D image but displays the operational support information (e.g., the operational support information 411 to 416 shown in FIG. 4) on the display portion 180. That is, the display control portion 170 displays the operational support information on the display portion 180, and transmits the image information (e.g., the data stream) for displaying the 3D image on the display device 200 to the display device 200 via the information input and output portion 190.

Furthermore, for example, in a case where the 3D viewing mode is set, when the image which is the display target is the 2D image, the display control portion 170 creates the image (the 2D image) in which the operational support information is overlapped with the image data maintained in the image memory 160. Moreover, the display control portion 170 displays the created 2D image on the display portion 180 and the display device 200. The display examples thereof will be specifically described with reference to FIGS. 3, 4 or the like.

The display portion 180 is a display portion that displays various information (plane images) based on the control of the display control portion 170. As the display portion 180, for example, a LCD (Liquid Crystal Display), an organic EL (Electro Luminescence) panel or the like can be used. In addition, the operation receipt portion 130 and the display portion 180 may be integrally constituted by a touch panel that can perform various input operations by the contact or the proximity of a finger or the like on the display screen.

The information input and output portion 190 is connected to the display device 200 via the inter-device interface 20, and performs the input and output of various information performed between it and the display device 200 based on the control of the UI control portion 140. For example, the information input and output portion 190 transmits the data stream, which is created by the display control portion 170 as the image information for displaying the image on the display device 200, to the display device 200. Furthermore, for example, in a case where the setting operation of setting the 3D viewing mode as the viewing mode of the display device 200 is received by the operation receipt portion 130, the information input and output portion 190 transmits the 3D viewing mode setting information for setting the 3D viewing mode to the display device 200. Moreover, for example, in a case where the setting operation of setting the 2D viewing mode as the viewing mode of the display device 200 is received by the operation receipt portion 130, the information input and output portion 190 transmits the 2D viewing mode setting information for setting the 2D viewing mode to the display device 200. In addition, the information input and output portion 190 is an example of an information output portion described in the claims.

Display Example in Imaging Device and Display Device

Figure 4:
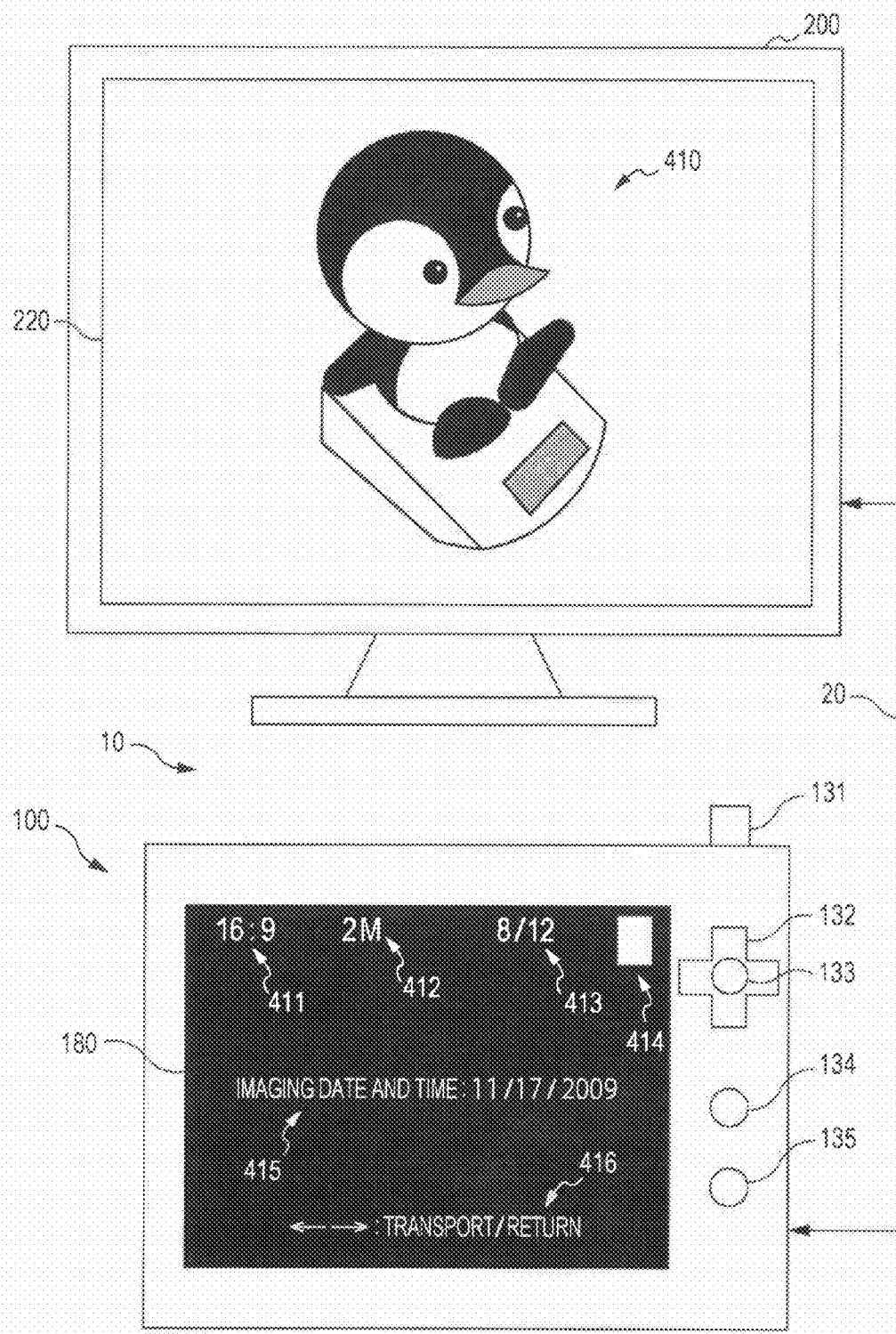
FIG. 4 is a diagram that shows a display example of a display portion (an imaging device) and a display portion (a display device) in the first embodiment of the present invention.

FIGS. 3 and 4 are diagrams that show the display examples of the display portion 180 (the imaging device 100) and the display portion 220 (the display device 200) in the first embodiment of the present invention. FIG. 3 shows a display example in a case where the 2D image is displayed as the image contents and FIG. 4 shows a display example in a case where the 3D image is displayed as the image contents.

As shown in FIG. 3, when the 2D image is displayed as the image contents, approximately the same image is displayed on the display portion 180 (the imaging device 100) and the display portion 220 (the display device 200). That is, on the display portion 180 (the imaging device 100) and the display portion 220 (the display device 200), the operational support information 401 to 406 are displayed on the 2D image (the plane image including a crab 400 in FIG. 3) in an overlapped manner.

Herein, the operational support information 401 to 406 is, for example, information for supporting the operation thereof when a user performs the reproduction of the image contents. As the operational support information, for example, the respective image information (e.g., imaging date and time, and image size) concerning the image which is the display target, operation members (e.g., an image transmission button, an image return button, and a stop button), operation guide information for supporting the operation, and icons indicating various information are displayed.

Specifically, the operational support information 401 is a value which indicates the aspect ratio of the displaying image, and the operational support information 402 is a value which indicates the image size of the displaying image. Furthermore, the operational support information 403 is a value which indicates the total number of the images which are the display target and the number of the items of the display image among the total number. The operational support information 404 is an icon that indicates the kind of the recording medium on which the displaying image is stored. Furthermore, the operational support information 405 is a value that indicates the imaging date and time of the displaying image, and the operational support information 406 are characters that indicates an operation guide for supporting the image forwarding operation or the image returning operation of the image which is the display target. In addition, in the present example, the case of displaying the operational support information 401 to 406 as the operational support information is shown, but other operational support information may be displayed. In addition, since the operational support information 401 to 406 are displayed on the 2D image in an overlapped manner, it is desirable to display them at the edge portion (e.g., an upper portion or a lower portion of the 2D image) of the 2D image so that the 2D image is easily viewed.

Herein, when the 2D image is displayed as the image contents, since the display image is viewed by a user in two dimensions, it is considered that there is hardly any difficulty in viewing the two-dimensional image even when the two-dimensional image (the operational support information) is displayed on the display image in an overlapped manner. On the contrary to this, when the 3D image is displayed as the image contents, the display image thereof is viewed by a user in three dimensions. For this reason, when the two-dimensional image (the operational support information) is displayed on the display screen thereof in an overlapped manner, it is also supposed that the operational support information is covered by the stereoscopic image, so that the operational support information is difficult to see.

For example, when the operational support information is displayed so as to be arranged at the back, the operational support information is viewed to be covered by the stereoscopic image which appears just before it, whereby the operational support information is difficult to see, and the unnatural image may be generated. On the other hand, when the operational support information is displayed so as to be at the front, the operational support information appears in front of the other stereoscopic images, which may cause an image (e.g., an image which makes eyes tired when read) that is difficult to for a user to see.

Herein, since a stereoscopic image such as a movie can distinguish an optimal depth in advance, the operational support information can also be arranged at a suitable position. On the contrary to this, in the case of the stereoscopic image recorded by the imaging device 100, the depth amounts completely differ depending on the image. For this reason, in order to arrange the operational support information in an optimal position, for example, it is necessary to perform a huge calculation using a processor with the rapid arithmetic operation processing. For this reason, for example, providing on a dedicated circuit for the arrangement of the operational support information is also considered. However, in the case of a portable device such as the imaging device 100, it is important to provide a low-cost model and to reduce the cost. For this reason, it is desirable to suitably display the operational support information without mounting the dedicated circuit or the processor with the rapid arithmetic operation.

Thus, in the first embodiment of the present invention, when the 3D image as the image contents is displayed on the display portion 220 (the display device 200), the operational support information is not displayed on the display image in an overlapped manner. In this case, the 3D image is not displayed, but only the operational support information is displayed on the display portion 180 (the imaging device 100). This display example is shown in FIG. 4.

As shown in FIG. 4, when the 3D image is displayed as the image contents, the different images are displayed on the display portion 180 (the imaging device 100) and the display portion 220 (the display device 200). That is, only the 3D image (the stereoscopic image including a toy penguin 410 on a table in FIG. 4) is displayed on the display portion 220 (the display device 200). Furthermore, only the operational support information 411 to 416 are displayed on the display portion 180 (the imaging device 100).

Herein, a case is supposed where a user wears specialized glasses (active shutter type glasses) to view the stereoscopic image. The specialized glasses alternately open and close the liquid crystal shutter in synchronization with the right eye image and the left eye image that are alternately displayed on the display portion 220, and have polarization plates inserted therein. For this reason, when a user wears the specialized glasses, the luminance seems to drop on the whole (that is, the luminance seems to relatively decline). For this reason, when the stereoscopic image is displayed on the display portion 220 (the display device 200) to view the stereoscopic image, raising the luminance of the display panel to cope therewith is considered. Moreover, even regarding the display portion 180 (the imaging device 100), at the time of setting the 3D viewing mode, the contrast can be secured by raising the luminance of the display panel to cope therewith.

Furthermore, when the stereoscopic image is displayed on the display portion 220 (the display device 200), by displaying the operational support information 411 to 416 colored in white on the black image in an overlapped manner, the image with high contrast can be obtained on the display portion 180 (the imaging device 100). In addition, in the present example, an example in which the operational support information is displayed by the combination of white and black has been shown, but, for example, the operational support information may be displayed by the combination of yellow and black.

In addition, the operational support information 411 to 416 correspond to the operational support information 401 to 406 shown in FIG. 3.

Furthermore, when the 3D image is displayed as the image contents, the 3D image is not displayed, but only the operational support information 411 to 416 are displayed on the display portion 180 (the imaging device 100). For this reason, it is possible to arrange and display the operational support information 411 to 416 at a position that is easily viewed by a user without the necessity of displaying the operational support information 411 to 416 in the edge portion of the display screen. That is, it is possible to change the arrangement of the operational support information in a case where the 2D image is displayed as the image contents and the operational support information in a case where the 3D image is displayed. Furthermore, in addition to the arrangement, for example, at least one of color, luminance, and the size of characters in the display screen may be changed. The change of the arrangement or the like will be specifically described with reference to FIGS. 8A and 8B.

In addition, in this example, the case of displaying the operational support information 411 to 416 as the operational support information has been shown, but other operational support information may be displayed.

Furthermore, since only the 3D image (the stereoscopic image including a toy penguin 410 on a table) is displayed on the display portion 220 (the display device 200), a user can enjoy the stereoscopic image that is easier to see.

In this manner, according to the first embodiment of the present invention, for example, even when a user wears the specialized glasses (the active shutter type glasses) to view the stereoscopic image, it is possible to make the stereoscopic image and the operational support information easier to see. Furthermore, in the case of viewing the stereoscopic image, since the stereoscopic image is displayed on the display device 200, it is possible to view the stereoscopic image without impeding a three-dimensional effect. In this case, since only the operational support information is displayed on the imaging device 100, the operational support information is not covered by the stereoscopic image and the operation in the stereoscopic image can be comfortably performed.

Operation Example of Imaging Device

Figure 5:
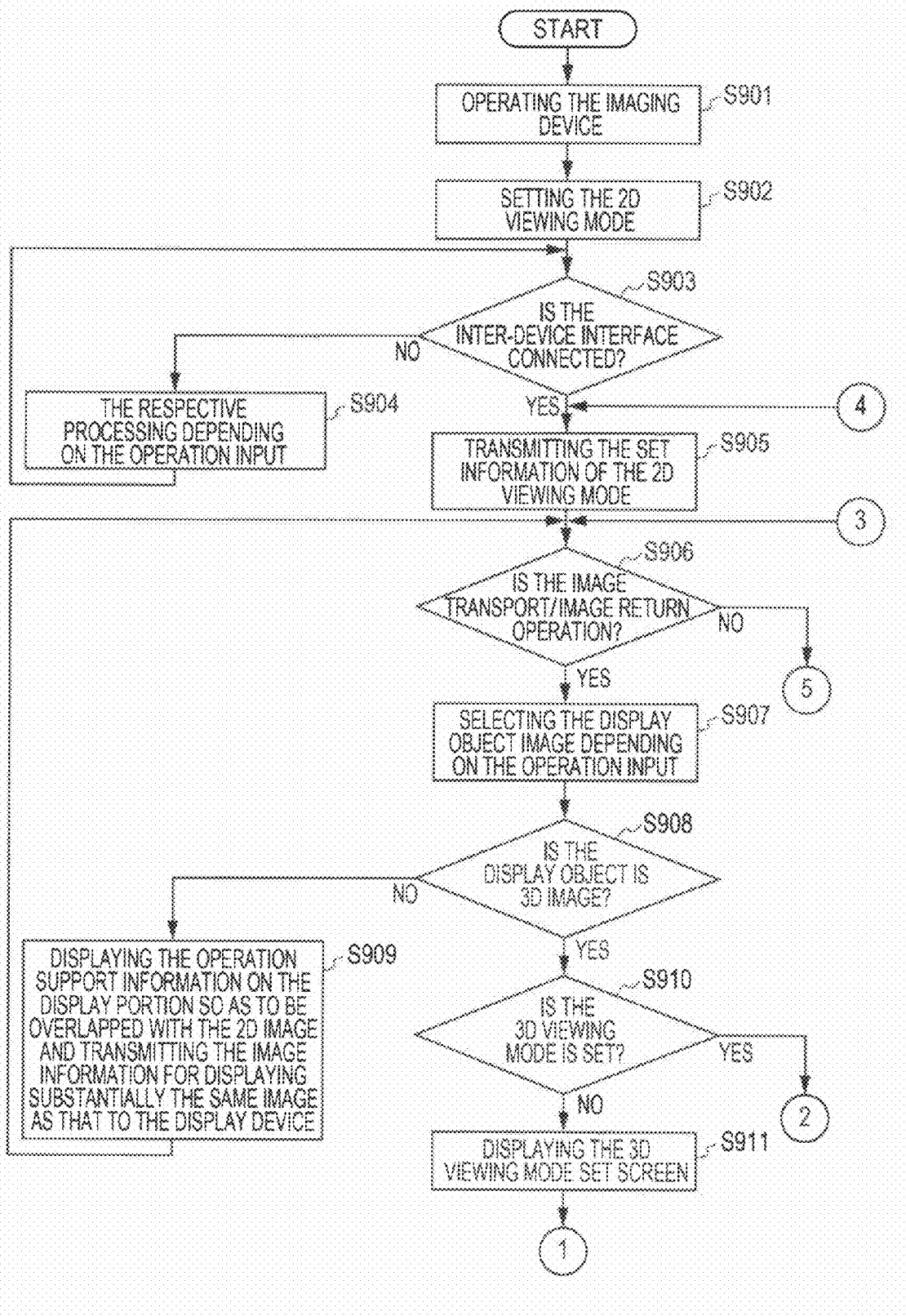
FIG. 5 is a flow chart that shows an example of a processing sequence of image contents reproduction processing by an imaging device in the first embodiment of the present invention.
Figure 6:
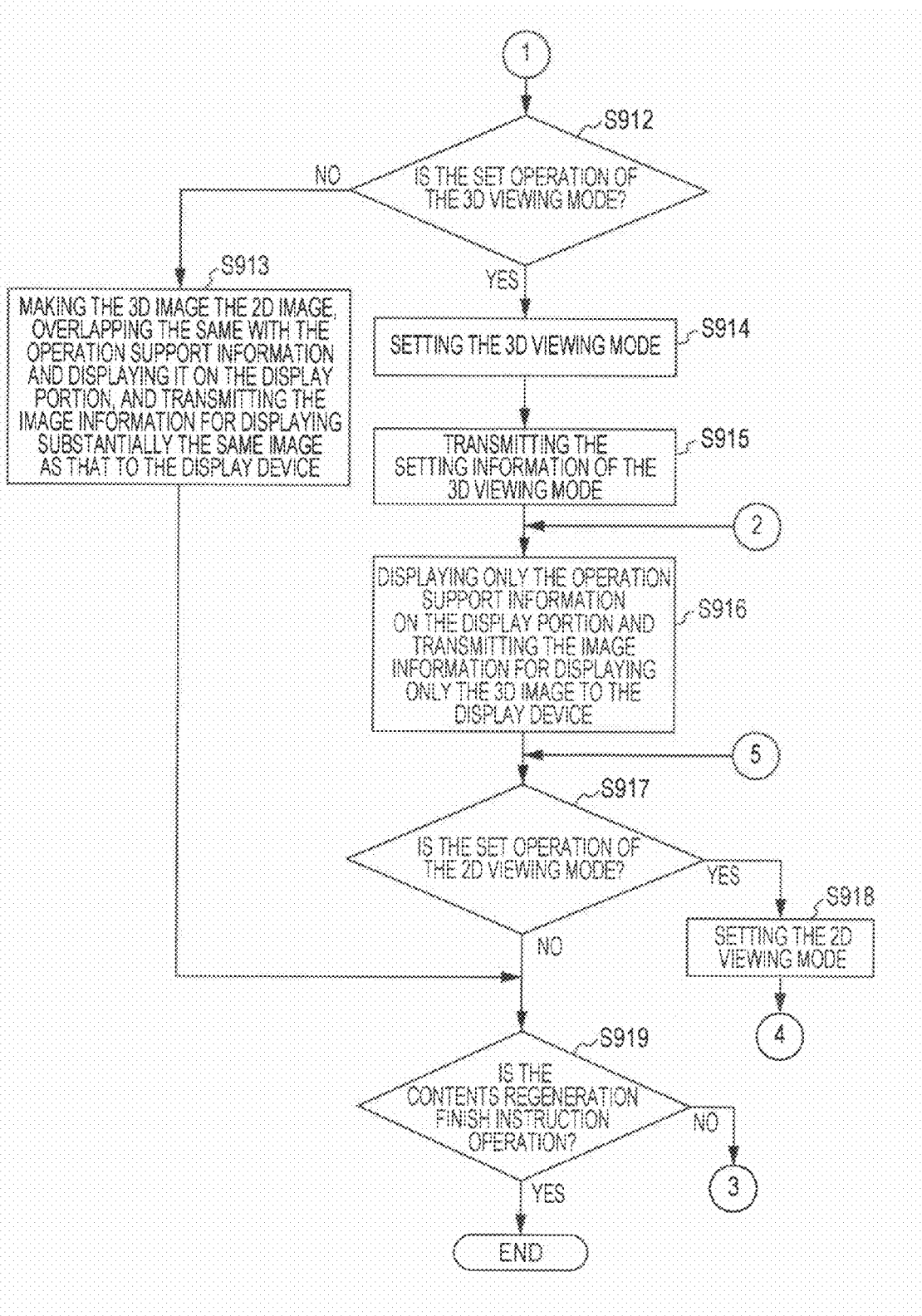
FIG. 6 is a flow chart that shows an example of a processing sequence of an image contents reproduction processing of an imaging device in the first embodiment of the present invention.

FIGS. 5 and 6 are flow charts that show an example of a processing sequence of the image contents reproduction processing by the imaging device 100 in the first embodiment of the present invention. In this example, a case will be explained as an example where the image contents stored in the imaging device 100 are displayed on the display device 200 by the image forwarding operation or the image returning operation by a user. Furthermore, a case will be explained as an example where only the two dimensional image is displayed on the display portion 180 of the imaging device 100. In addition, the operation example of the display device 200 will be specifically explained with reference to FIG. 7.

Firstly, when the operation input is received in which the power supply of the imaging device 100 is turned on by the user operation, the imaging device 100 is activated (step S901). Next, the 2D viewing mode is set (step S902). Next, it is decided whether or not the inter-device interface 20 is connected (step S903). That is, it is decided whether or not the imaging device 100 is connected to the display device 200 via the inter-device interface 20.

When the inter-device interface 20 is not connected (step S903), various processing depending on the operation input from a user are performed (step S904). On the other hand, when the inter-device interface 20 is connected (when the imaging device 100 is connected to the display device 200 via the inter-device interface 20) (step S903), the setting information of the 2D viewing mode is transmitted to the display device 200 (step S905). That is, the UI control portion 140 transmits the setting information of the 2D viewing mode to the display device 200 via the information input and output portion 190. As a result, the 2D viewing mode is set on the display device 200. Furthermore, a user wears the specialized glasses as the necessity arises.

Next, it is decided whether or not the image forwarding operation or the image returning operation is performed (step S906). When the image forwarding operation or the image returning operation is not performed (step S906), the process progresses to step S917. On the other hand, when the image forwarding operation or the image returning operation is performed (step S906), the image which is the display target is selected depending on the operation input (the image forwarding operation or the image returning operation) (step S907). That is, the reproduction control portion 150 acquires and decodes the image contents from the image contents memory portion 300 depending on the operation input thereof, thereby developing the decoded image data to a predetermined area in the image memory 160.

Next, it is decided whether or not the image which is the display target is the 3D image (step S908). That is, the UI control portion 140 decides whether or not the image is the 3D image based on the distinction result of the image contents by the reproduction control portion 150. When the image which is the display target is not the 3D image (when the image which is the display target is the 2D image) (step S908), the image in which the operational support information is overlapped with the 2D image is displayed on the display portion 180 (the imaging device 100) and the display portion 220 (the display device 200) (step S909). That is, the display control portion 170 displays the image, in which the operational support information is overlapped with the 2D image maintained in the image memory 160, on the display portion 180, thereby outputting the image information for displaying substantially the same image as this image to the display device 200 via the information input and output portion 190. In addition, step S908 is an example of a judgment sequence described in the claims. Moreover, step S909 is an example of a first control sequence described in the claims.

Furthermore, when the image which is the display target is the 3D image (step S908), it is decided whether or not the 3D viewing mode is set (step S910). When the 3D viewing mode is set, the process progresses to step S916. On the other hand, when the 3D viewing mode is not set (step S910), the display control portion 170 displays the 3D viewing mode setting screen for setting the 3D viewing mode on the display portion 180 (step S911).

Next, it is decided whether or not the setting operation of the 3D viewing mode is performed in the 3D viewing mode setting screen that is displayed on the display portion 180 (step S912). When the setting operation of the 3D viewing mode is not performed (step S912), the image, in which the 3D image which is the display target is made as the 2D image and the operational support information is overlapped with the 2D image, is displayed on the display portion 180 and the display portion 220 (step S913). That is, the display control portion 170 makes the 3D image maintained in the image memory 160 into the 2D image, displays the image, in which the operational support information is overlapped, on the 2D image on the display portion 180, and outputs the image information for displaying substantially the same image as this image to the display device 200 via the information input and output portion 190.

Furthermore, when the setting operation of the 3D viewing mode is performed (step S912), the 3D viewing mode is set in the imaging device 100 (step S914), and the setting information of the 3D viewing mode is transmitted to the display device 200 (step S915). That is, the UI control portion 140 transmits the setting information of the 3D viewing mode to the display device 200 via the information input and output portion 190. As a result, the 3D viewing mode is set in the display device 200.

Next, the operational support information is displayed on the display portion 180 (the imaging device 100) and the 3D image which is the display target is displayed on the display portion 220 (the display device 200) (step S916). That is, the display control portion 170 displays the operational support information on the display portion 180 and the 3D image maintained in the image memory 160 on the display device 200. In this case, the operational support information is not displayed but only the 3D image is displayed on the display device 200, and the 3D image is not displayed but only the operational support information is displayed on the display portion 180. In addition, the step S916 is an example of a second control sequence described in the claims.

Next, it is decided whether or not the setting operation of the 2D viewing mode is performed (step S917). When the setting operation of the 2D viewing mode is performed (step S917), the 2D viewing mode is set in the imaging device 100 (step S918), and the setting information of the 2D viewing mode is transmitted to the display device 200 (step S905).

Furthermore, when the setting operation of the 2D viewing mode is not performed (step S917), it is decided whether or not the contents reproduction completion instruction operation is performed (step S919). When the contents reproduction completion instruction operation is performed, the operation of the image contents reproduction processing is completed. On the other hand, when the contents reproduction completion instruction operation is not performed (step S919), the process returns to the step S906.

In addition, the present example has shown an example in which, when the image which is the display target is the 3D image and the 3D viewing mode is not set, the 3D viewing mode setting screen is displayed and the setting operation of the 3D viewing mode is performed in the 3D viewing mode setting screen. However, the viewing mode setting screen is displayed for setting the 2D viewing mode or the 3D viewing mode by a predetermined user operation, so that the setting operation of a desired viewing mode may be performed in the viewing mode setting screen.

Operation Example of Display Device

Figure 7:
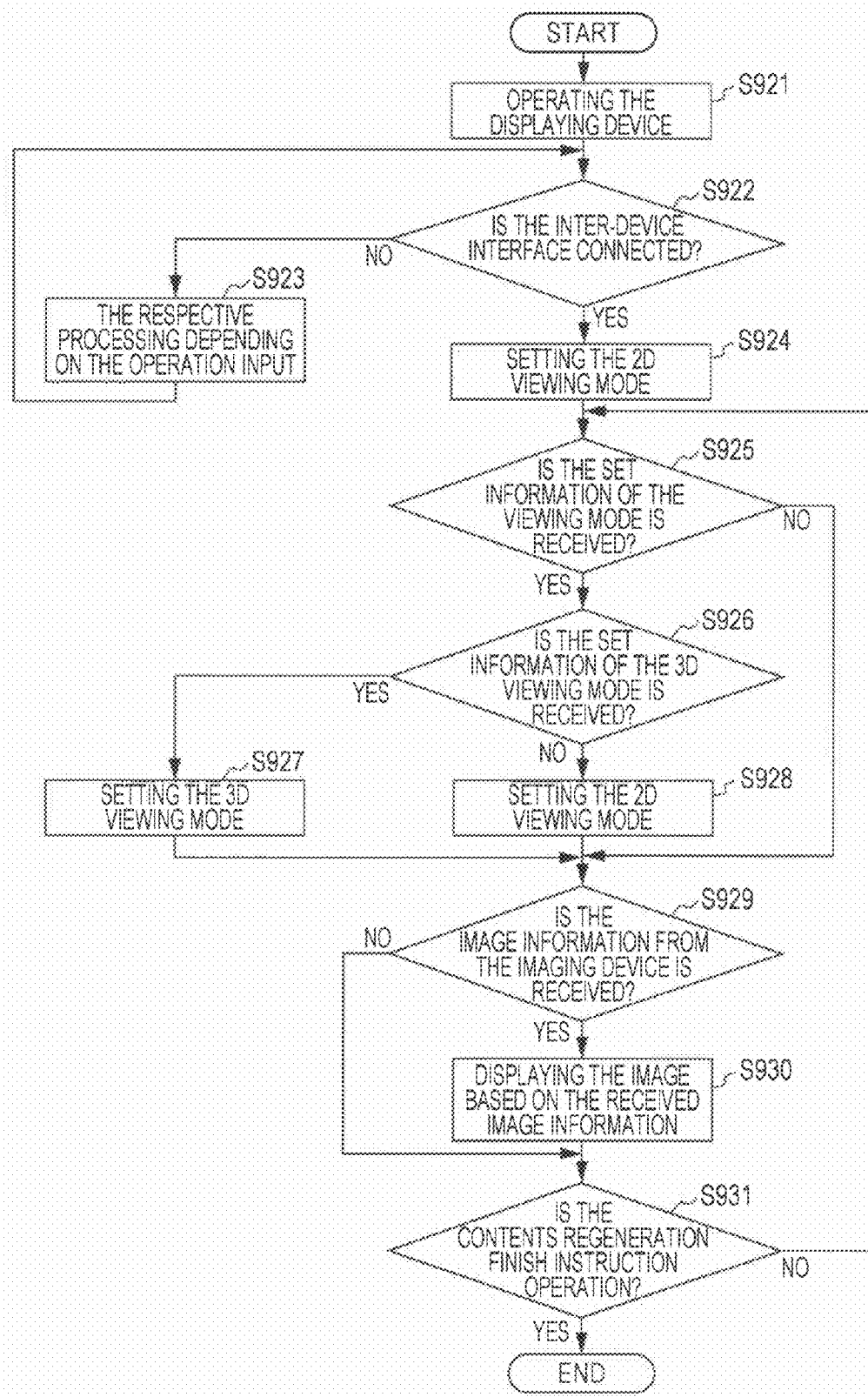
FIG. 7 is a flow chart that shows an example of a processing sequence of an image contents reproduction processing of a display device in the first embodiment of the present invention.

FIG. 7 is a flow chart that shows an example of the processing sequence of the image contents reproduction processing by the display device 200 in the first embodiment of the present invention. In the example, a case will be explained as an example where the image contents stored in the imaging device 100 are displayed on the display device 200 through the image forwarding operation or the image returning operation by a user.

Firstly, when the operation input is received in which the power supply of the display device 200 is turned on by the user operation, the display device 200 is activated (step S921). Next, it is decided whether or not the inter-device interface 20 is connected (step S922). That is, it is decided whether or not the display device 200 is connected to the imaging device 100 via the inter-device interface 20.

When the inter-device interface 20 is not connected (step S922), various processing depending on the operation input from a user are performed (step S923). On the other hand, when the inter-device interface 20 is connected (when the display device 200 is connected to the imaging device 100 via the inter-device interface 20) (step S922), the 2D viewing mode is set (step S924). Furthermore, a user wears the specialized glasses as the necessity arises.

Next, it is decided whether or not the setting information of the viewing mode from the imaging device 100 is received (step S925), whereby, when the setting information of the viewing mode is not received, the process progresses to step S929. On the other hand, when the setting information of the viewing mode is received (step S925), it is decided whether or not the setting information of the 3D viewing mode is received (whether or not the setting information of the received viewing mode is the setting information of the 3D viewing mode) (step S926).

When the setting information of the 3D viewing mode is received (step S926), the 3D viewing mode is set (step S927). On the other hand, when the setting information of the 3D viewing mode is not received (when the setting information of the 2D viewing mode is received) (step S926), the 2D viewing mode is set (step S928).

Next, it is decided whether or not the image information from the imaging device 100 is received (step S929), whereby, when the image information is not received, the process progresses to step S931. On the other hand, when the image information is received (step S929), the image (the two-dimensional image in which the stereoscopic image and the operation support image are overlapped) is displayed on the display portion 220 based on the received image information (step S930).

In addition, it is decided whether or not the contents reproduction completion instruction operation is performed (step S931). When the contents reproduction completion instruction operation is performed, the operation of the image contents reproduction processing is completed. On the other hand, when the contents reproduction completion instruction operation is not performed (step S931), the process returns to the step S925.

Arrangement Example of Operational Support Information

FIGS. 3 and 4 explained cases where the operational support information which is displayed to be overlapped with the 2D image during display of the 2D image is substantially the same as the operational support information which is displayed on the imaging device 100 during display of the 3D image, as an example. Herein, during display of the 2D image, since the operational support information is displayed to be overlapped with the 2D image, it is necessary to arrange the operational support information so that it covers the 2D image as little as possible. For this reason, it is desirable to arrange the operational support information in the vicinity of the up and down and left and right edge portions in the 2D image. On the contrary to this, during display of the 3D mage, since only the operational support information is displayed in the imaging device 100, the operational support information can be arranged regardless of the 3D image to be the displayed. Thus, in order to easily see the operational support information even in the state in which a user wears the specialized glasses (e.g., the active shutter type glasses), the operational support information during display of the 2D image may be displayed differently from the operational support information during display of the 3D image. For example, during display of the 3D image, the arrangement of the operational support information may be changed to enlarge the characters or the like. This display example is shown in FIGS. 8A and 8B.

Figure 8A:
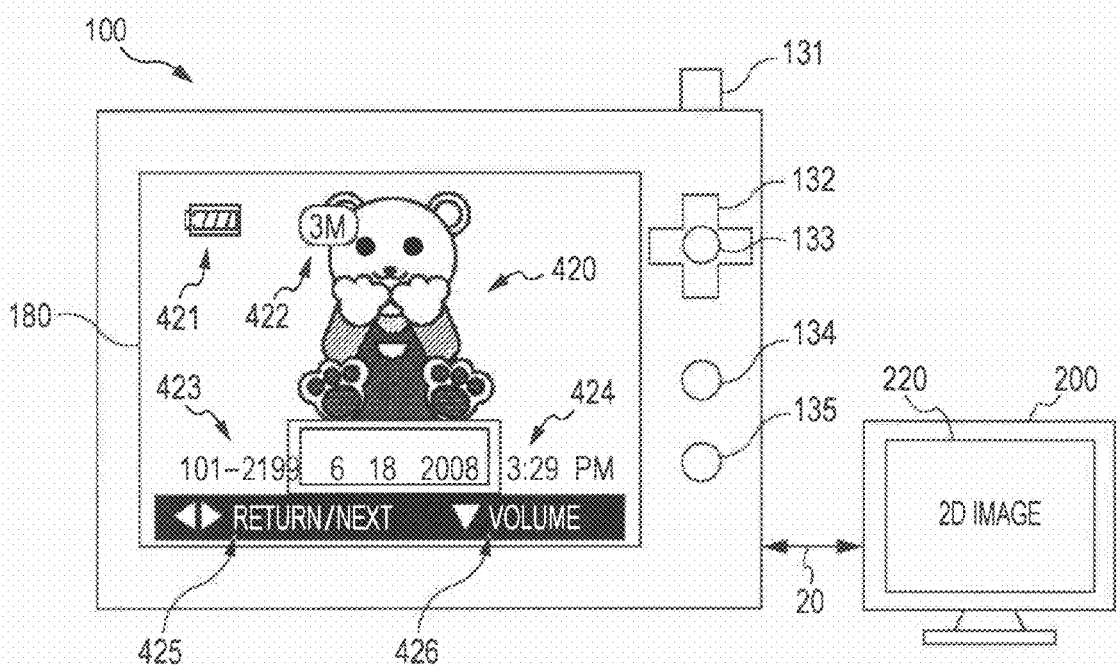
FIGS. 8A and 8B are diagrams that show transition examples of a display screen to be displayed on a display portion in the first embodiment of the present invention.
Figure 8B:
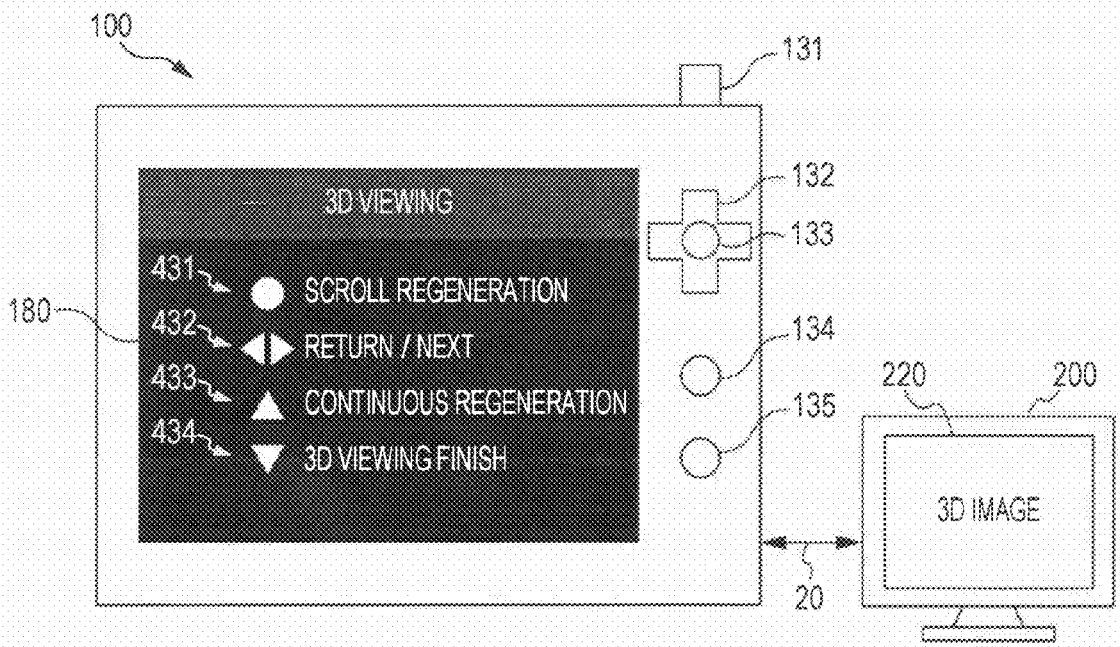

FIGS. 8A and 8B are diagrams that show transition examples of the display screens to be displayed on the display portion 180 in the first embodiment of the present invention. FIG. 8A shows a display example of the display portion 180 during display of the 2D image and FIG. 8B shows a display example of the display portion 180 during display of the 3D image. In addition, the examples shown in FIGS. 8A and 8B briefly show only the characters (the "2D image" or the "3D image") which show the kinds of the images which is the display target as the image displayed on the display portion 220 (the display device 200).

As shown in FIG. 8A, when the 2D image is displayed on the display portion 220, the operational support information 421 to 426 are displayed to be overlapped with the 2D image (the plane image including a teddy bear 420 on a table in FIG. 8A) on the display portion 180. In this case, approximately the same display screen is also displayed on the display portion 220.

The operational support information 421 is an icon that shows the battery capacity of the imaging device 100, and the operational support information 422 is a value that shows the image size of the displaying image. Furthermore, the operational support information 423 is a number that shows a file name (2199) of the image which is the display target and a folder name (101) to which the file belongs. Moreover, the operational support information 424 is a value that shows the imaging date and time of the displaying image. Furthermore, operational support information 425 and 426 are operation guides for operating the displaying image. For example, the operational support information 425 is an operation guide which shows that the image forwarding operation or the image returning operation can be performed by pressing the left and right buttons of the cross button 132. Furthermore, the operational support information 426 is an operation guide which shows that the setting screen for performing the volume adjustment can be displayed by pressing the lower button of the cross button 132.

As shown in FIG. 8B, when the 3D image is displayed on the display portion 220, only the operational support information 431 to 434 are displayed on the display portion 180 to be overlapped with the black image. In this case, only the 3D image is displayed, but the operational support information 431 to 434 are not displayed on the display portion 220.

The operational support information 431 is an operation guide that shows that the scroll reproduction operation can be performed by pressing a decision button 133. Furthermore, the operational support information 432 is an operation guide that shows that the image forwarding operation or the image returning operation can be performed by pressing the left and right button of the cross button 132. Moreover, the operational support information 433 is an operation guide that shows that the continuous reproduction can be performed by pressing the upper button of the cross button 132. Furthermore, the operational support information 434 is an operation guide that shows that the 3D viewing mode can be completed and the 2D viewing mode can be set by pressing the lower button of the cross button 132. For example, the setting operation of the 2D viewing mode of step S917 shown in FIG. 6 is performed by the operation input (the pressing operation of the lower button of the cross button 132) shown in the operational support information 434.

Furthermore, as shown in FIGS. 8A and 8B, by further reducing the number of the operational support information 431 to 434 when the 3D image is displayed on the display portion 220 so as to be less that of the operational support information 421 to 426 when the 2D image is displayed on the display portion 220, the characters can be enlarged. In this manner, by displaying the minimum operational support information 431 to 434 as the operational support information when the 3D image is displayed on the display portion 220 in a relatively large size, the operational support information can be easily viewed even in the state in which a user wears the specialized glasses. As a result, the operation during display of the 3D image can be further comfortably and easily performed.

2. Second Embodiment

The first embodiment of the present invention has shown an example in which, when the 3D image is displayed on the display device 200, the plane image including the operational support information is displayed on the imaging device 100. Herein, when the 3D image is displayed on the display device 200, since a user wears the specialized glasses, it is supposed that the 3D image can be naturally viewed. Thus, a second embodiment of the present invention shows an example, in which, when the 3D image is displayed on the display device 200, the 3D image (the 3D image for displaying the operational support information in three dimensions) is also displayed on the imaging device 100. In addition, the configuration of the contents reproduction system, and the functional structure of the imaging device and the display device in the second embodiment of the present invention are the same as those of examples shown in FIGS. 1 and 2 except that the stereoscopic image is displayed on the imaging device 100. For this reason, the portions which are the same as the first embodiment of the present invention will be denoted by the same reference numerals and a part of the descriptions thereof will be omitted.

That is, in the second embodiment, in a similar manner to the display device 200, the display portion 180 of the imaging device 100 is a display device that can provide a user with the stereoscopic image by wearing the specialized glasses for viewing the stereoscopic image. As the display portion 180, a liquid crystal display or the like capable of displaying the stereoscopic image can be used.

Furthermore, the display control portion 170 of the imaging device 100 displays the operational support information as the stereoscopic image on the display portion 180 when the image contents displayed on the display portion 220 is the 3D image, based on the control from the UI control portion 140. In this case, the stereoscopic image is displayed on the display portion 180 in synchronization with the right eye image and the left eye image that are alternately displayed on the display portion 220 of the display device 200. As a result, a user can see the stereoscopic image displayed on the imaging device 100 and the display device 200 in the state of wearing the specialized glasses.

Display Example of Operational Support Information

FIGS. 9A to 9C and 10A to 10C are diagrams that show transition examples of the display screens displayed on the display portion 180 in the second embodiment of the present invention.

Figure 9A:
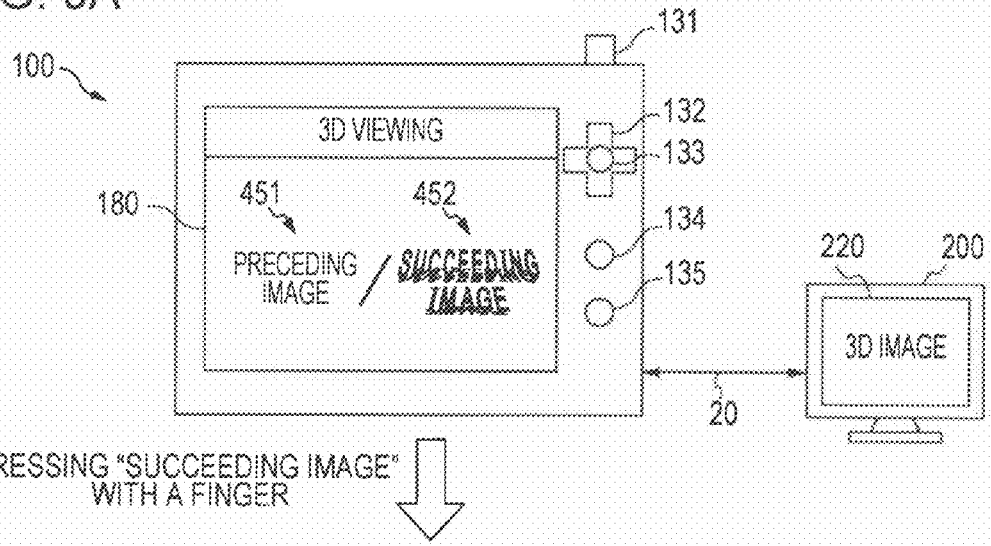
FIGS. 9A to 9C are diagrams that show transition examples of a display screen to be displayed on a display portion in the second embodiment of the present invention.
Figure 9B:
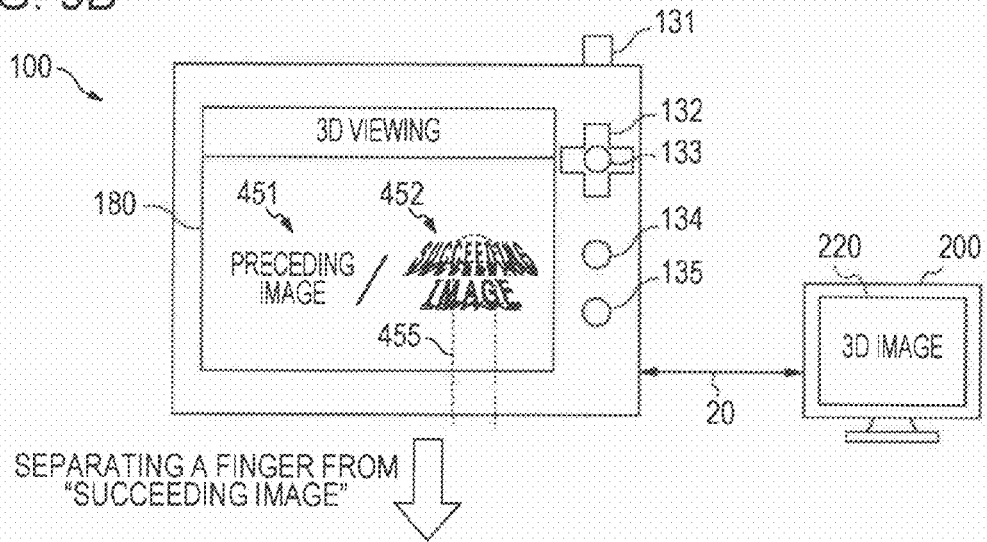
Figure 9C:
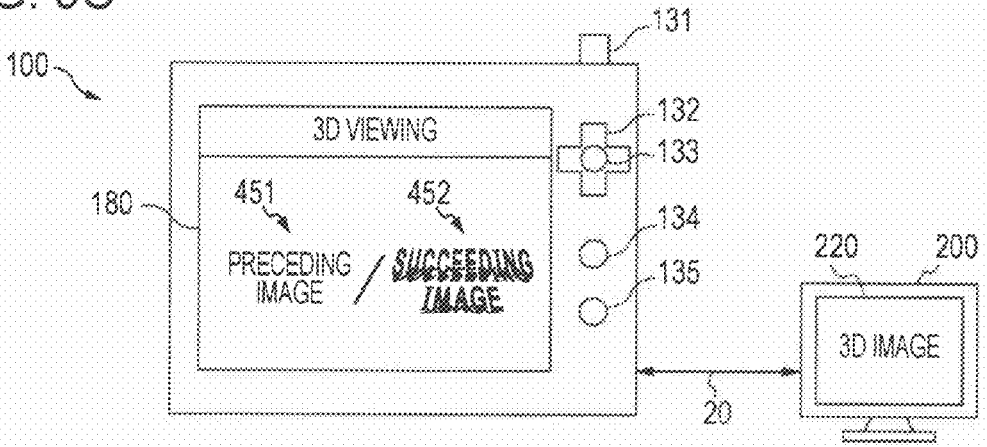

FIGS. 9A to 9C show display transition examples when the image forwarding operation is performed in a case where the 3D image is displayed on the display device 200. Furthermore, in the examples shown in FIGS. 9A to 9C, the display portion 180 includes a touch panel.

On the display portion 180 of the imaging device 100, the operational support information ("a previous image" button)

451 for performing the image returning operation, and the operational support information ("a next image" button) 452 for performing the image forwarding operation are displayed. In addition, in the examples shown in FIGS. 9A to 9C, in order to facilitate the explanation, the display of other operational support information is omitted. Furthermore, the examples shown in FIGS. 9A to 9C show examples in which only the mainly used operation button is displayed as the stereoscopic image and other operation buttons are displayed as the two-dimensional image. That is, only the operational support information ("the next image" button) 452 is displayed as the stereoscopic image, and the operational support information ("the previous image" button) 451 is displayed as the two-dimensional image.

For example, when the image forwarding operation of the 3D image displayed on the display device 200 is performed in the state shown in FIG. 9A, a user performs the operation (the pressing operation) of pressing the operational support information ("the next image" button) 452 with a finger 455. The display example after performing the pressing operation is shown in FIG. 9B.

As shown in FIG. 9B, when a user presses the operational support information ("the next image" button) 452 with the finger 455, the character portion is deformed by the animation so that the character portion (the next image) of the operational support information ("the next image" button) 452 is pressed. As a result, user easily grasps that the pressing operation of the operational support information ("the next image" button) 452, which is displayed in three dimensions, is performed. In addition, in the state in which a user brings the finger 455 into contact with the display screen of the display portion 180, a hold state is obtained.

Next, in the state shown in FIG. 9B, a user separates the finger 455 from the operational support information ("the next image" button) 425. In this case, as shown in FIG. 9C, the character portion is deformed by the animation so that the character portion (the next image) of the operational support information ("the next image" button) 452 becomes the original state. As a result, a user easily grasp that the pressing of the operational support information ("the next image" button) 452, which is displayed in three dimensions, is halted. In addition, a user separates the finger 455 from the display screen of display portion 180, whereby the image forwarding processing of the 3D image displayed on the display device 200 is performed.

In this manner, by subjecting the operational support information to the special effect so that it appears in three dimensions (three dimensional visual effect), it is possible to provide an environment that is easily operated by a user who enjoys the stereoscopic image. That is, in the case of performing the pressing operation of the operational support information (the operation button) that is displayed in three dimensions, the special effect of pressing the actual button can be obtained, which can provide a user with operational enjoyment.

In addition, the present example shows an example in which only the mainly used operational support information (e.g., the operation button) is displayed as the stereoscopic image, but other operational support information may be displayed in a similar manner as the stereoscopic image. Furthermore, each depth may be changed and displayed based on the importance or the like.

Furthermore, the present example shows an example in which the user operation is performed using the touch panel, but the user operation may be performed using a cursor as shown in FIGS. 10A to 10C and may be performed by other user operations.

FIGS. 10A to 10C show display transition examples in the case of performing the continuous reproduction operation when the 3D image is displayed on the display device 200.

On the display portion 180 of the imaging device 100, the operational support information (the scroll reproduction) 501, the operational support information (the image transport/the transport return) 502, and the operational support information (the continuous reproduction) 503 are displayed. In addition, the operational support information (the scroll reproduction) 501 is operational support information for performing the scroll reproduction operation, and the operational support information (the image transport/the image return) 502 is operational support information for performing the image forwarding operation or the image returning operation. Moreover, the operational support information (the continuous reproduction) 503 is a continuous reproduction operation. In addition, in the examples shown in FIGS. 10A to 10C, in order to facilitate the explanation, the display of other operational support information is omitted. In addition, the continuous reproduction is a reproduction processing by which the imaging device 100 automatically performs the image transport.

For example, when the continuous reproduction operation of the 3D image displayed on the display device 200 is performed in the state shown in FIG. 10A, a cursor 500 is overlapped with the operational support information (the continuous reproduction) 503 by the user operation. For example, the cursor 500 can be moved by the operation of the cross button 132. In this manner, the display example in the state in which the cursor 500 is overlapped with the operational support information (the continuous reproduction) 503 is shown in FIG. 10B.

As shown in FIG. 10B, when the cursor 500 is overlapped with the operational support information (the continuous reproduction) 503 by the user operation, the character portion is deformed by the animation so that the character portion (the continuous reproduction) of the operational support information (the continuous reproduction) 503 appears further forward. As a result, the three-dimensional effect of the operational support information which is the object of the user operation can be further emphasized and is easily grasped by a user. In addition, by performing the decision operation (e.g., the pressing operation of a decision button 133) in the state in which the cursor 500 is overlapped with the operational support information (the continuous reproduction) 503, the continuous reproduction processing can be started.

Furthermore, in the state shown in FIG. 10B, the cursor 500 is separated from the operational support information (the continuous reproduction) 503. In this case, as shown in FIG. 10C, the character portion is deformed by the animation so that the character portion (the continuous reproduction) of the operational support information (the continuous reproduction) 503 becomes the original state. As a result, a user easily grasps that the cursor 500 is separated from the operational support information (the continuous reproduction) 503 that is displayed in three dimensions.

In this manner, by subjecting the operational support information to the special effect (three-dimensional visual effect) so that it appears in three dimensions, it is possible to provide the environment that is easily operated by a user who enjoys the stereoscopic image. That is, since, in the state in which the cursor is overlapped with the operational support information that is displayed in three dimensions, the three-dimensional effect of the operational support information is displayed in an emphasized manner, a user easily operates the operational support information, which can improve the enjoyment of the image contents.

Furthermore, this example has shown an example in which the user operation is performed using the cursor, but, as shown in FIGS. 9A to 9C, the user operation may be performed using a touch panel and may be performed by other user operations.

In addition, in the embodiments of the present invention, the imaging device is explained as an example, but, the stereoscopic image contents stored in the recording medium can be displayed on an external display device, and the embodiments of the present invention can be applied to an image processing device including the display portion. For example, the embodiments of the present invention can be applied to an image processing device such as a mobile phone having the imaging function, a navigation system, and a portable media player.

In addition, the embodiments of the present invention show an example for embodying the present invention, and, as specified in the embodiments of the present invention, has the correspondence relationship with each of the items in the embodiments of the present embodiment and each of the specific items of the invention in the claims. In a similar manner, the embodiments of the invention have the correspondence relationship with each of the specific items of the invention in the claims and each of the items in the embodiments of the present invention with the same name. However, the present invention is not limited to the embodiments, but can be embodied by variously modifying the embodiments within the scope without departing from the gist of the present invention.

Moreover, the processing sequence explained in the embodiments of the present invention may be grasped as the method having a series of sequences and may be grasped as a program for executing the series of sequences in a computer and a recording medium that stores the program. The recording medium, for example, a CD (Compact Disc), a MD (Mini-Disc), a DVD (Digital Versatile Disk), a memory card, a Blu-ray Disc (trade mark) or the like can be used.

The present application contains subject matter related to that disclosed in Japanese Priority Patent Application JP 2010-030100 filed in the Japan Patent Office on Feb. 15, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a first display device; and
circuitry configured to:
output an image stored in a recording medium to a second display device that is external to the image processing device;
judge whether the image is a plane image or a stereoscopic image when the image is displayed on the second display device;
control, when the image is a plane image, the image and operational support information overlapping the image to be displayed on the first display device and on the second display device, the operation support information for supporting the displaying of the image; and
control, when the image is a stereoscopic image, the operational support information to be displayed without the image on the first display device, and with the image to be displayed on the second display device.

2. The image processing device according to claim 1, wherein
the circuitry is further configured to set either a stereoscopic image display mode to display the stereoscopic image on the second display device, or a plane image display mode to display the plane image on the second display device,
when the image is the stereoscopic image and the stereoscopic image display mode is set, the circuitry is further configured to control displaying only the stereoscopic image on the second display device and displaying only the operational support information on the first display device, and
when the image is the stereoscopic image and the plane image display mode is set, the circuitry is configured to convert the stereoscopic image into the plane image and control displaying the image and the operational support information overlapping the plane image on the first display device and on the second display device.

3. The image processing device according to claim 2, wherein the circuitry is further configured to transmit to the second display device a stereoscopic setting information for displaying the image when the image is stereoscopic and the stereoscopic image display mode is set.

4. The image processing device according to claim 2, wherein the circuitry is further configured to transmit to the second display device a plane setting information for displaying the image when the image is planar and the plane image display mode is set.

5. The image processing device according to claim 1, wherein the circuitry is further configured to change at least one of an arrangement, a color, a luminance, and the size of characters in the first display device of the operational support information depending on whether the image is the plane image or the stereoscopic image.

6. The image processing device according to claim 1, wherein the circuitry is further configured to control, when the image is the stereoscopic image, displaying at least a part of the operational support information on the first display device as the stereoscopic image.

7. The image processing device according to claim 1, wherein the circuitry is further configured to control, when the image is the stereoscopic image, displaying the image and the operational support information overlapping the plane image on the first display device and on the second display device.

8. The image processing device according to claim 1, wherein
the circuitry is further configured to set either a stereoscopic image display mode to display the stereoscopic image on the second display device, or a plane image display mode to display the plane image on the second display device,
when the image is the stereoscopic image and the stereoscopic image display mode is set, the circuitry is configured to control displaying only the stereoscopic image on the second display device and displaying only the operational support information on the first display device, and
when the image is the stereoscopic image and the plane image display mode is set, the circuitry is further configured to set the stereoscopic display mode to replace the plane image display mode and control displaying only the stereoscopic image on the second display device and displaying only the operational support information on the first display device.

9. An image processing method comprising the steps of:
judging, by circuitry of an image processing device including the circuitry and a first display device, whether an image stored in a recording medium is a plane image or a stereoscopic image when the image is displayed on a second display device that is external to the image processing device;
controlling, by the circuitry, when the image is as plane image, the image and operational support information overlapping the image to be displayed on the first display device and on the second display device the operational support information for supporting the displaying of the image; and
controlling, by the circuitry, when the image is a stereoscopic image, the operational support information to be displayed without the image on the first display device, and with the image to be displayed on the second display device.

10. A non-transitory computer-readable medium storing a program that, when executed by a computer including circuitry and a first display device, cause the computer to perform a process, the processing comprising:
judging, by the circuitry, whether an image stored in a recording medium is a plane image or a stereoscopic image when the image is displayed on a second display device that is external to the computer;
controlling, by the circuitry, when the image is as plane image, the image and operational support information overlapping the image to be displayed on the first display device and on the second display device the operational support information for supporting the displaying of the image; and
controlling, by the circuitry, when the image is a stereoscopic image, the operational support information to be displayed without the image on the first display device, and with the image to be displayed on the second display device.

* * * * *